(12) United States Patent
Azuma

(10) Patent No.: US 7,477,582 B2
(45) Date of Patent: Jan. 13, 2009

(54) DISK APPARATUS

(75) Inventor: Akihiro Azuma, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 629 days.

(21) Appl. No.: 11/265,495

(22) Filed: Nov. 3, 2005

(65) Prior Publication Data

US 2006/0092800 A1    May 4, 2006

(30) Foreign Application Priority Data

Nov. 4, 2004    (JP)    ............ P.2004-320928

(51) Int. Cl.
*G11B 7/00*    (2006.01)
(52) U.S. Cl. .......... 369/53.2; 369/53.22; 369/47.1; 369/47.32
(58) Field of Classification Search .......... 369/53.22, 369/53.2, 47.1, 47.32
See application file for complete search history.

(56) References Cited

U.S. PATENT DOCUMENTS

2003/0179676 A1* 9/2003 Ito ............ 369/53.22

2006/0044966 A1* 3/2006 An et al. ............ 369/47.1

FOREIGN PATENT DOCUMENTS

| JP | A-2000-011527 | 1/2000 |
| JP | A-2000-332010 | 11/2000 |
| JP | A-2002-117614 | 4/2002 |

* cited by examiner

*Primary Examiner*—Tan X Dinh
*Assistant Examiner*—Linh T Nguyen
(74) *Attorney, Agent, or Firm*—Morgan, Lewis & Bockius LLP

(57) ABSTRACT

A disk apparatus includes: a kind discrimination unit for discriminating the kind of a loaded disk; a designation unit by which the user designates the prior order for discriminating the kind of the disk; and a frequency of use of storage unit for counting and storing a frequency of use of each kind of disks used in the past, wherein the kind discriminating unit is adapted to discriminate when the frequency of use of each kind of disk stored in the frequency of use storage unit exceeds a preset reference level indicating the predetermined tendency of use the kind of the disk in accordance with a priority order according to the tendency of use thereof, and discriminate when the tendency of use is not higher than the mentioned reference level the kind of the disk in the priority order designated by the designation unit.

5 Claims, 3 Drawing Sheets

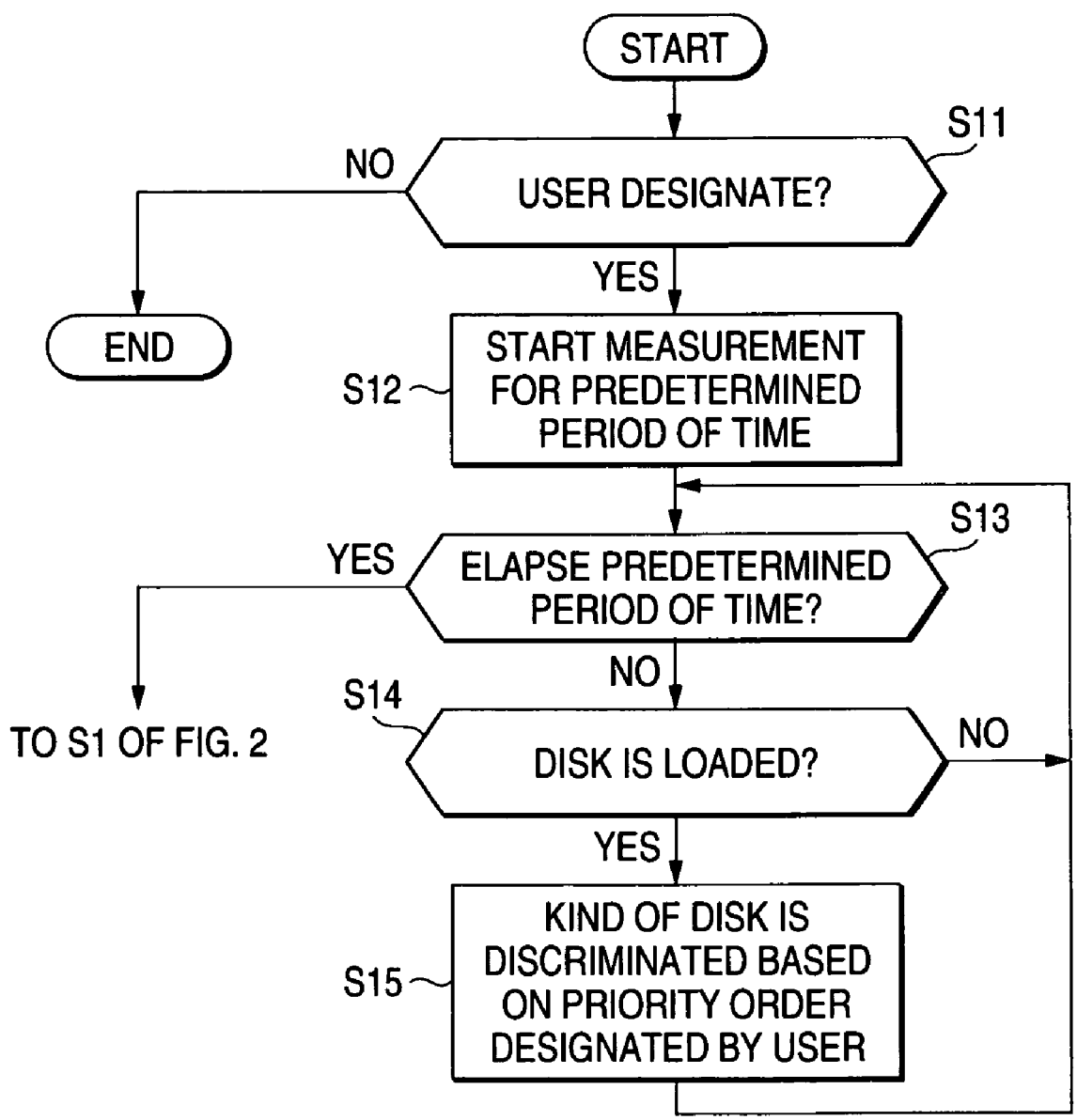

DISK APPARATUS

BACKGROUND OF THE INVENTION

1. Field of the Invention

The present invention relates to a disk apparatus provided with a discriminating unit for discriminating the kind of one disk from that of another loaded on the apparatus, and more particularly to a disk apparatus capable of carrying out a disk discriminating process speedily in accordance with the user's condition of use of the apparatus.

2. Description of the Related Art

A related art disk apparatus can use a plurality of kinds of disks, such as CD (Compact Disc), CD-R (CD Recordable), CD-RW (CD Rewritable) and DVD (Digital Versatile Disk). Therefore, various kinds of disk apparatuses devised so that the kind of a loaded disk can be discriminated more speedily from that of another have been proposed (refer to, for example, JP-A-2000-11527, JP-A-2000-332010 and JP-A-2002-117614).

In the disk apparatus disclosed in JP-A-2000-11527, the frequency of use of each kind of disk is counted every time the discrimination of the disks is conducted, a subsequent disk discriminating process is carried out in the order of the frequency of use of the disks. In the case of the disks the frequencies of use of which are equal, the disk discriminating process is carried out in the order of a preset priority. This enables a disk discrimination process to be carried out in accordance with a user's mode of use of the disks.

In the apparatus disclosed in JP-A-2000-332010, the individual discrimination information on a disk the information recorded on which was once reproduced is stored in an individual discrimination information storage unit, and automatic regulation information corresponding to the disk in an automatic regulation information storage unit. In order to then reproduce the information recorded in the disk, the automatic regulation information corresponding to the disk is read from the automatic regulation information storage unit, and the reproduction of the information is carried out. Namely, an automatic regulation process for a reproduction circuit with respect to the information recorded in a disk which has once been subjected to the reproduction of the information recorded therein.

When order information for determining the priority order for discriminating the kind of disk from that of another is inputted by a user's operation in the apparatus disclosed in JP-A-2002-117614, a disk discriminating process is carried out in the apparatus in accordance with the priority thereof every time a disk is loaded in the apparatus. This enables the disk which the user usually uses to be discriminated quickly from another.

In the apparatus disclosed in JP-A-2000-11527, a subsequent discrimination process is carried out in order from a disk the frequency of use of which is larger, so that the time taken for the disk discriminating process can be reduced. However, in view of the user's convenience of using the apparatus, a disk discriminating process carried out always in the order of the larger frequency of use thereof is not necessarily best. In short, when the user has come to consciously use the disk, for example, DVD which he had theretofore used non-frequently, it is advantageous to carry out a discrimination process for the DVD from the first. The user's setting of the priority order for the disk discriminating process, which is done in the apparatus disclosed in JP-A-2002-117614, for improving this condition, can attain this object. However, when the user sets the priority order and forgets canceling what is set with the user thereafter coming to encounter even a case where, for example, CD-RAM, the frequency of use of which is larger is used frequently, the disk discriminating process starts from the DVD for an indefinite time. Therefore, it takes more time conversely to carry out the disk discriminating process.

In short, the problem of whether to carry out a disc discrimination process in the order of the largeness of the frequency of use thereof, or in the order of the priority set by the user has to be dealt with according to the circumstances. However, such a disk discrimination process in accordance with the circumferences cannot be carried out by only a combination of the techniques disclosed in JP-A-2000-11527 and those disclosed in JP-A-2002-117614.

When the information recorded on a disk and reproduced once is reused in the apparatus disclosed in JP-A-2000-332010, a disk discrimination process is omitted, so that this apparatus is very convenient. However, when a new disk is loaded, it is necessary that an automatic discrimination process be carried out in the order formally used, so that it takes much time to carry out a discrimination process for a newly loaded disk.

SUMMARY OF THE INVENTION

The present invention has been made so as to solve these problems, and an object of the invention is to provide a disk apparatus which a user can use conveniently by preparing a disk discrimination method plurally, and shifting the method to be used from one to another in accordance with the condition of use of the apparatus by the user and in accordance with the circumstances.

In order to solve these problems, the disk apparatus according to the present invention is formed so that the apparatus has a kind discrimination unit for discriminating the kind of a loaded disk from another, the apparatus including a designation unit for designating the priority order for discriminating the kind of a loaded disk from another by the user, and a frequency of use of storage unit for counting the of the frequency of use of the disks in the past and storing these frequencies, wherein the kind of disk discriminating unit is adapted to discriminate the kind of the loaded disk from another in accordance with the tendency of use thereof when the frequency of use of each kind of disk stored in the frequency of use storage unit exceeds a preset reference level which shows a definite tendency of use, and in accordance with the priority order designated by the designation unit when the tendency of use is not higher than the mentioned preset reference level. A difference between the frequency of use of a kind of disk and those of frequency of another kind of disk can be set as the reference level.

When the frequency in the past of use of the kinds of disks indicate a definite tendency, for example, when CD-R was used 36 times, CE-RW 24 times, CD 12 times and DVD 1 time, i.e., when each kind of the disks has a certain tendency of use definitely (when a difference between the number of use of a kind of disk and that of use of another kind of disk is not smaller than 10 in the above example), the discrimination process is carried out in accordance with this tendency of use of the disks, i.e., in the order of CD-R, CD-RW, CD and DVD. When there is not a definite tendency of the use of the disks, i.e., when, for example, CD-R was used 20 times, CD-RW 22 times, CD-RW 18 times and DVD 21 times, i.e., when there is not a large difference in the frequency of use of the disks (a difference between the frequency of use of a disk and that of use of another is not larger than 5 in the above example), the disk discriminating process is carried out in the priority order designated by the user. This enables a disk discriminating process to be carried out in accordance with the user's condition of use of the disks and in accordance with the circumstances.

Designating the priority order by the user means that the possibility of using the disks in accordance with this order for some time thereafter is high. Therefore, the kind of disk discriminating unit may be formed taking such circumstances into consideration so that, when the user designates the priority order by the designation unit, the kind of the loaded disk may be discriminated from another in the priority order designated by the user for a predetermined period of time (for example, one week and the like) thereafter. In this case, the frequency of use of each kind of disk in the past is not taken into consideration. This enables a discrimination process for the disk in conformity with the user's intention to be carried out, and the disk discrimination time to be shortened.

When the user designates a first-rank disk only (i.e., one kind of disk only), the frequency of use may be taken into consideration for the priority order to be designated thereafter. For example, when the user designates CD only as a disk of a first-rank priority order in a case where the frequencies of use of each kind of disk in the past are CE-R 60 times, CD-RW 60 times, CD 20 times and DVD 5 times, the kind discriminating unit may take the designation and the mentioned frequency of use into consideration, and a disk discrimination process may be carried out in the order of CD, CD-R, CD-RW and DVD. This enables a disk discriminating process in conformity with the disk-using condition of the user to be carried out.

The present invention is provided with an automatic function of automatically discriminating the kind of the loaded disk from that of another in a certain order. The kind discriminating unit mentioned above may discriminate the kind of the loaded disk by the automatic discriminating function when the tendency of the use of the disk is not higher than the mentioned reference level with the priority order not designated by the designation unit. The priority order taken by the automatic function is generally CD, CD-R, CD-RW and DVD.

EFFECT OF THE INVENTION

When the frequency of use of each kind of disk stored in the frequency of use storage unit in the disk apparatus according to the present invention exceeds a preset reference level indicative of a predetermined tendency of use of the disks, the discriminating of the kind of the loaded disk is done in the priority order in accordance with the tendency of use thereof. When the tendency of use is not higher than the mentioned reference level, the kind of the loaded disk is discriminated from that of another in accordance with the priority order designated by the designation unit. Therefore, the disk priority order can be changed in accordance with the user's condition of use of the disks and in accordance with the circumstances. This enables the disk discrimination time to be shortened.

When the user designates the user's priority order by using the designation unit in the disk apparatus according to the present invention, the kind of disk discrimination process is carried out in accordance with the user's designated priority order for the subsequent predetermined period of time. This enables the disk discrimination process to be carried out in conformity with the user' intention to be carried out, and the disk discrimination time to be shortened.

BRIEF DESCRIPTION OF THE DRAWINGS

These and other objects and advantages of this invention will become more fully apparent from the following detailed description taken with the accompanying drawings in which:

FIG. 3 is a flow chart for describing the disk discriminating process in Embodiment 2 of the disk apparatus according to the present invention.

DETAILED DESCRIPTION OF THE PREFERRED EMBODIMENTS

A mode of embodiment of the present invention will now be described with reference to the drawings.

Figure 1:
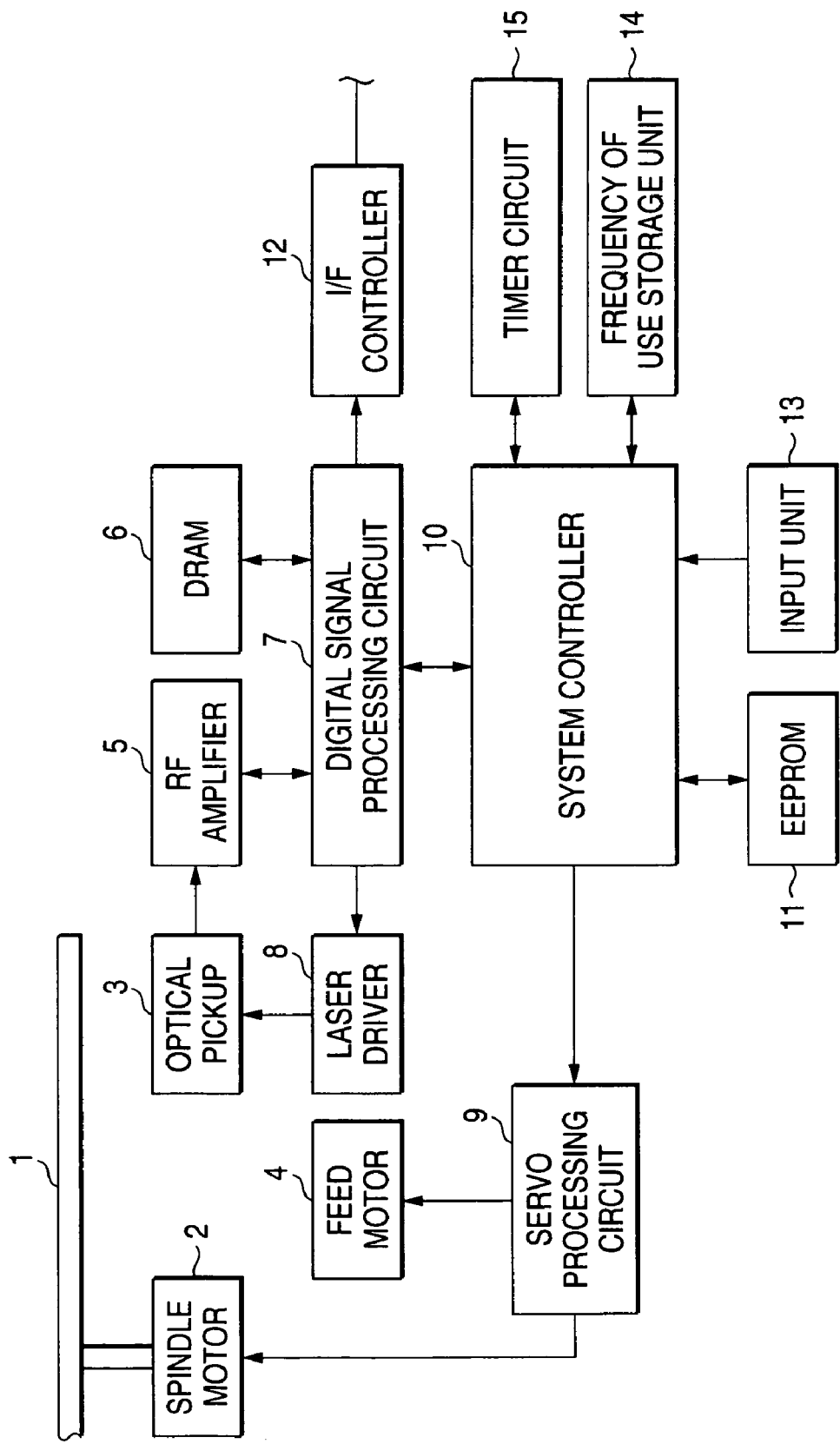
FIG. 1 is a function block diagram showing an example of the disk apparatus according the present invention.

FIG. 1 is a function block diagram showing an example of this mode of embodiment of the disk apparatus. The disk apparatus of this mode of embodiment may be of an exclusive reproduction type, or may be of a recording reproduction type. In this mode of embodiment, a system structure of a recording reproduction type disk apparatus is shown as an example. Reproducible, or recordable and reproducible disks 1 used in this disk apparatus include various types of disks, such as CD, CD-R, CD-RW and DVD and so forth.

An output terminal of an optical pick-up 3 adapted to write data in the disk 1 and read the written data are connected to a digital signal processing circuit 7 via a RF amplifier 5, and an output terminal of the digital signal processing circuit 7 to a laser driver 8 adapted to control a laser output generated at the time for writing data and at the time for reading data. An output terminal of a servo-processing circuit 9 is connected to a feed motor 4, which is adapted to move the optical pick-up 3 in the radial direction of the disk 1, and a spindle motor 2, which is adapted to rotate the disk 1. These digital signal processing circuit 7 and servo-processing circuit 9 are two-way connected to a system controller 10.

A DRAM 6 as a buffer for temporarily storing the data practically read from the disk 1 is two-way connected to the digital signal processing circuit 7, while an EEPROM 11 for storing intrinsic information, such as parameters of the disk and parameters of the laser power is two-way connected to the system controller 10. An input unit 13, which is adapted to input signals for operating various kinds of function switches, such as an injection switch and a priority order designation switch and the like into the system controller 10, is connected to the system controller 10. A frequency storage unit (counter, etc.) 14 for counting the frequency of use of each disk 1 used in the past and storing the counted frequency, and a timer circuit 15 for measuring a subsequent predetermined period of time (for example, one week) when the user designate the priority order are also connected to the system controller 10.

An interface controller (1/F controller) 12 for conducting the connection thereof to a host computer (not shown) is two-way connected to the system controller 10 and digital signal processing circuit 7. Although an illustration is omitted, a program for practicing a disk judgement process, which constitutes the characteristics of the present invention, is stored in an internal memory (ROM and the like) in the system controller 10.

The system controller 10 discriminates the kind of the loaded disk from that of another in accordance with the priority order determined according to the tendency of use thereof when the frequency of use of each kind of disk stored in the frequency of use storage unit 14 exceeds a preset reference level (for example, a difference between the frequency of use of each kind of disk) indicating a predetermined tendency of use thereof. When the priority order is not designated by the input unit 13, the automatic discrimination function, which is adapted to automatically discriminate the kind of disk in accordance with a preset certain order, discriminates the kind of the loaded disk. When the user designates the priority order by the input unit 13, the kind of the loaded disk is discriminated in accordance with the user's designated priority order for a subsequent predetermined period of time (for example, one week).

The reference level mentioned above will now be described.

The difference in the frequency of use of each kind of disk 1 can be set as the reference level. When the frequency of use of the disks are CD-R 36 times, CD-RW 24 times, CD 12 times and DVD one time, in which the difference in the frequency of use is not smaller than 10 times and definitely shows a predetermined tendency of use, the difference in the frequency of use of 10 times is set as a reference level. Whether there is a certain tendency of use or not is judged on the basis of a result of judgement as to whether an actual frequency of use is not lower than the reference level or not higher than the same.

In this case, a total frequency of use may be taken into consideration. In the above-mentioned example, a total frequency of use is 73 (=36+24+12+1), which is between 50 and 100. Therefore, when a total frequency of use is not lower than 50 and lower than 100, a difference in frequency of use determined as a reference level is set to 10. Similarly, when a total frequency of use is not lower than zero and lower than 50, a difference in frequency of use determined as a reference level is set to 5. When a total frequency of use exceeds 100, a difference in frequency of use determined as a reference level is set to 15. Thus, the reference level maybe changed suitably in accordance with all frequencies of use.

Concerning this reference level, an upper limit (for example, 100) is fixed to, for example, a total frequency of use. When a total frequency of use exceeds 100, the total frequency of use may be regulated so that the total frequency of use always becomes 100 by reducing the counting value of the frequency of use in the order of oldness of the use of the disk. When the regulation is thus made, the condition of use of the disk during the time immediately close to the present time is reflected upon the frequency of use, so that the priority order of discrimination of the disk in conformity with the condition of use of the disk of the user can be set.

Such reference levels may be stored in advance in the internal memory (ROM, etc.) of the system controller 10.

An example of the disk discriminating process in the disk apparatus in this mode of embodiment will now be described.

Embodiment 1

The disk discrimination process in this embodiment 1 will be described with reference to the flow chart shown in FIG. 2.

The system controller 10 always monitors whether the disk 1 is loaded or not (Step S1). When the disk 1 is loaded (when the answer "Yes" is given in Step 1), the user judges (Step S2) whether the priority for the discrimination of the disk from another is inputted (designated) into the input unit 13. As a result, when the priority order is designated (when the answer "Yes" is given in Step S2) by the user, it is then judged (Step S3) with reference to the frequency storage unit 14 whether the past frequency of use of each kind of disk exceeds a reference level (concretely speaking, a difference in frequency of use of each kind of disk 1 is 10 and the like) set in advance which indicates a predetermined tendency of use of the disk.

As a result, when the past frequency of use of the disk exceeds (when the answer "Yes" is given in Step S3) the reference level, the kind of the loaded disk 1 is discriminated (Step S4) in accordance with the priority order according to the tendency of use. When the frequency of use of the disk is not higher than the reference level (when the answer "No" is given in Step S3), the kind of the loaded disk 1 is discriminated (Step S5) from that of another in accordance with the priority order designated by the user.

When the user do not designate the priority order in the judgement in Step S2 (when the answer "No" is given in Step S3), it is judged (Step S6) with reference to the frequency of use storage unit 14 whether or not the frequency of use in the past of each kind of disk exceeds the reference level indicating predetermined tendency of use thereof.

As a result, when the frequency of use exceeds (when the answer "Yes" is given in Step S6), the operation is made to advance to the Step S4 to discriminate the kind of the loaded disk 1 from that of another in accordance with the priority order according to the tendency of use thereof. When the frequency of use is lower than the reference level (when the answer "No" is given in Step S6), the kind of the disk 1 is discriminated from that of another (Step S7) in accordance with a predetermined order. The automatic discrimination process carried out in Step 7 is identical with that which has heretofore been carried in the related techniques.

Embodiment 2

The designation of priority order by the user means that the possibility of using the actual order for some time thereafter is high. In the Embodiment 2, such circumstances are taken into consideration. When the priority order is designated by the user by using the input unit 13, the system controller 10 discriminates the kind of the loaded disk 1 from that of another in accordance with the priority order designated by the user, for a subsequent predetermined period of time (for example, one week and the like).

The disk discrimination process in this Embodiment 2 will be described with reference to the flow chart shown in FIG. 3.

The system controller 10 constantly monitors (Step S11) the disk discriminating priority order as to whether the priority order was designated or not by the user by the input unit 13. When a different disk discriminating priority order is designated by the user, the timer circuit 15 is started, and measurement for a predetermined period of time (for example, one week and the like) is begun (Steps S12 and S13), whether the loading of the disk 1 is done or not being constantly monitored during this measurement operation (Step S14). When the disk 1 is loaded (when the answer "Yes" is given in Step S14), the system controller 10 discriminates (Step S15) the kind of the loaded disk 1 from that of another in accordance with the user's designated priority order.

Figure 2:
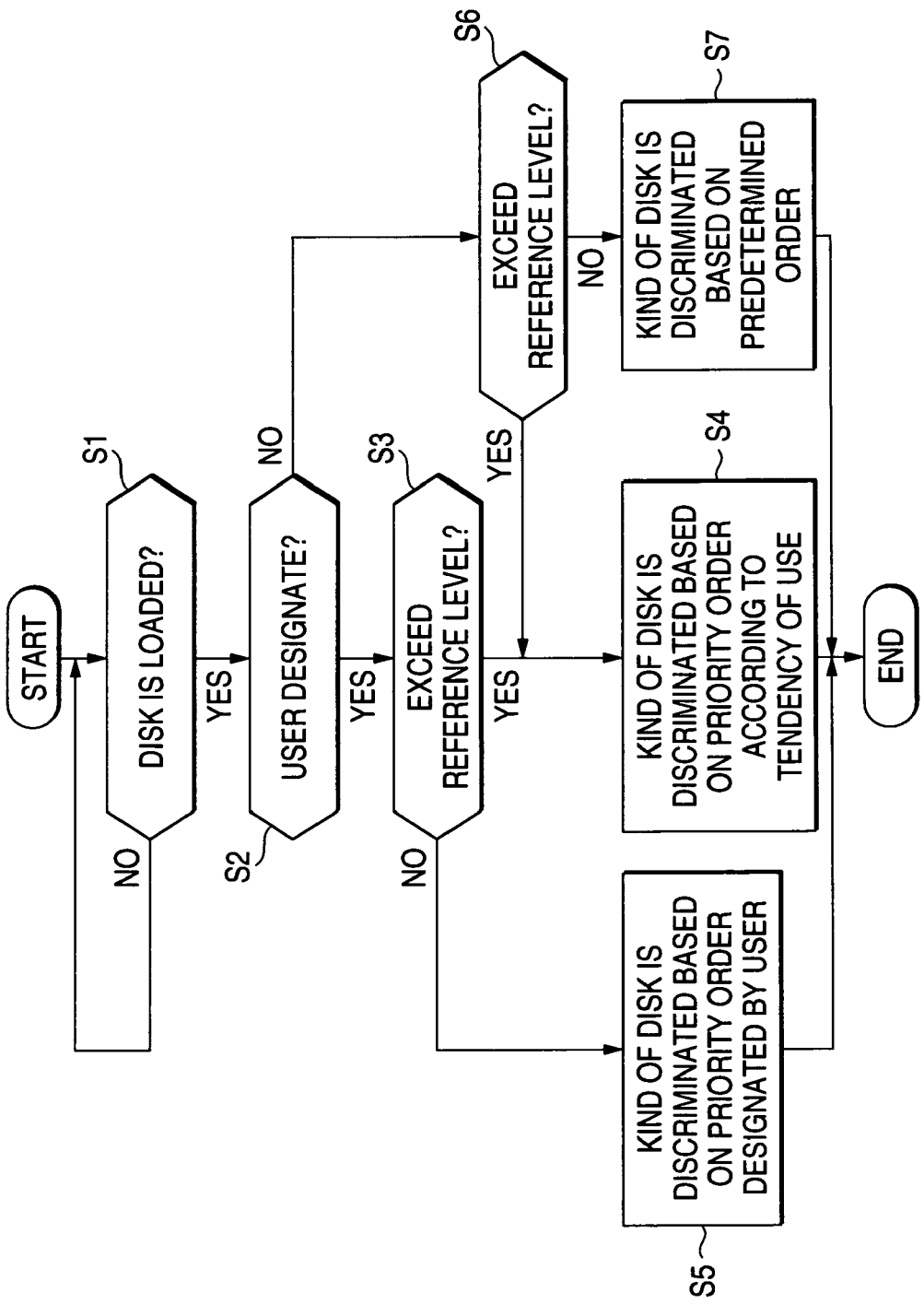
FIG. 2 is a flow chart for describing the disk discriminating process in Embodiment 1 of the disk apparatus according to the present invention.

When a predetermined period of time elapses (when the answer "Yes" is given in Step S13) after the user's priority order is designated, the operation advances to Step S1 shown in FIG. 2, where the disk discriminating process of Embodiment 1 is necessarily carried out.

What is claimed is:

1. A disk apparatus comprising:

a kind discrimination unit for discriminating the kind of a loaded disk;

a designation unit by which a user designates a priority order for discriminating the kind of the loaded disk; and a frequency of use of storage unit for counting and storing a frequency of use of each kind of disks used in the past, wherein the kind discrimination unit is adapted to discriminate when the frequency of use of each kind of disk stored in the frequency of use storage unit exceeds a difference in frequency of use of each kind of disk, which constitutes a reference level set in advance and indicating a predetermined tendency of use, the kind of the disk loaded in accordance with the priority order according to the tendency of use thereof, discriminate when the tendency of use is not higher than the difference in frequency of use of each kind of disk, which constitutes the reference level the kind of the loaded disk in accordance with the priority order designated by the designation unit, discriminate when the priority order is not designated by the designation unit the kind of the loaded disk by an automatic discrimination function for automatically discriminating the kind of the disk in accordance with a predetermined order set in advance, and discriminate for a subsequent predetermined period of time when the priority order is designated by the user by using the designation unit the kind of the loaded disk in accordance with the priority order designated by the user.

2. A disk apparatus comprising:

a kind discrimination unit for discriminating the kind of a loaded disk;

a designation unit by which the user designates the prior order for discriminating the kind of the loaded disk; and a frequency of use of storage unit for counting and storing a frequency of use of each kind of disks used in the past, wherein the kind discriminating unit is adapted to discriminate when the frequency of use of each kind of disk stored in the frequency of use storage unit exceeds a preset reference level indicating the predetermined tendency of use the kind of the loaded disk in accordance with a priority order according to the tendency of use thereof, and discriminate when the tendency of use is not higher than the mentioned reference level the kind of the loaded disk in the priority order designated by the designation unit.

3. The disk apparatus according to claim 2, wherein the reference level is a difference in frequency of use of each kind of disk.

4. The disk apparatus according to claim 2, wherein the kind discrimination unit discriminates for a predetermined subsequent period of time when the user designates the priority order by using the designation unit the kind of the loaded disk from that of another in the user's designated order.

5. The disk apparatus according to claim 2, wherein the apparatus is provided with an automatic discrimination function adapted to automatically discriminate the kind of the loaded disk from that of another in accordance with a predetermined order set in advance, and the kind discrimination unit discriminates when the tendency of use is not higher than the mentioned reference level with the priority order not designated by the designation unit the kind of the loaded disk from that of another by the automatic discrimination function.

* * * * *